United States Patent
Ho

(10) Patent No.: US 7,393,127 B1
(45) Date of Patent: Jul. 1, 2008

(54) LIGHT-GUIDING STRUCTURE

(75) Inventor: Chia-Ju Ho, Taipei (TW)

(73) Assignee: Inventec Corporation, Taipei (TW)

(*) Notice: Subject to any disclaimer, the term of this patent is extended or adjusted under 35 U.S.C. 154(b) by 0 days.

(21) Appl. No.: 11/690,135

(22) Filed: Mar. 23, 2007

(30) Foreign Application Priority Data

Dec. 7, 2006 (TW) .............................. 95145600 A

(51) Int. Cl.
*G02B 6/00* (2006.01)

(52) U.S. Cl. ..................... 362/551; 362/581; 362/576; 362/556; 362/554; 385/15; 385/31; 385/52; 385/88

(58) Field of Classification Search ................ None
See application file for complete search history.

(56) References Cited

U.S. PATENT DOCUMENTS

| 5,327,328 | A | * | 7/1994 | Simms et al. | ................. | 362/26 |
| 5,515,244 | A | * | 5/1996 | Levins et al. | ................ | 362/551 |
| 5,938,324 | A | * | 8/1999 | Salmon et al. | .............. | 362/555 |
| 7,046,906 | B1 | * | 5/2006 | Cho | .......................... | 385/146 |

* cited by examiner

*Primary Examiner*—Sandra O'Shea
*Assistant Examiner*—Danielle Dunn
(74) *Attorney, Agent, or Firm*—Jianq Chyun IP Office

(57) ABSTRACT

A light-guiding structure including a plurality of light pipes, a plurality of connecting portions and a fixing socket is provided. The light pipes are disposed on the fixing socket, and the light pipes are connected together by the connecting portions. At least one to-be-destroyed portion is formed between the connecting portions. In addition, the fixing socket has at least one destructive structure for disconnecting the connecting portions from each other by destroying the to-be-destroyed portion. Therefore, the interference caused by the light wave passing through the connecting piece is avoided.

13 Claims, 4 Drawing Sheets

LIGHT-GUIDING STRUCTURE

CROSS-REFERENCE TO RELATED APPLICATION

This application claims the priority benefit of Taiwan application serial no. 95145600, filed on Dec. 7, 2006. All disclosure of the Taiwan application is incorporated herein by reference.

BACKGROUND OF THE INVENTION

1. Field of the Invention

The present, invention relates to a light pipe, and more particularly to a light-guiding structure for preventing the interference of light waves.

2. Description of Related Art

Generally, most electronic devices take the signal light emitted by light emitting diodes (LEDs) as the indicating signal to show current operation state of the electronic device. However, since the position where the LED disposed from the surface of the casing of the electronic device is usually separated by a distance, a light pipe must be used to transmit the signal light wave, and display it on the surface of the casing.

Referring to FIG. 1, it is a schematic view of the configuration of conventional light pipes. Each LED 100 is disposed on one end of respective light pipe 110, which emits light wave with a different wavelength such as red light, blue light, or green light. When the light wave is transmitted in each light pipe 110, the user can see from each end of light pipes 110 that the indicating lamp is ON or Off state, so as to determine the current operation state of the electronic device.

However, due to the limitation on formation, when the light pipes 110 are fabricated, the light pipes 110 are connected through the plasticizing process by the fixing connecting portion 120, such that the light pipes 110 can be fixed on a suitable position in the electronic device. However, it may cause the light wave transferring from a light pipe 110 to another light pipe 110 through the fixing connecting portion 120, as a result, the light waves are mixed and the light signals are irregular. Therefore, how to prevent the light waves emitted by the LEDs 100 from being transferred into another light pipe 110 is an urgent issue.

SUMMARY OF THE INVENTION

Accordingly, the present invention is directed to a light-guiding structure, which is applicable for preventing the mutual interference of the light waves in the light pipes.

The present invention provides a light-guiding structure, which comprises a plurality of light pipes, a plurality of connecting portions, and a fixing socket. The light pipes are disposed on the fixing socket, and they are connected with the connecting portions. A to-be-destroyed portion is formed between the connecting portions. Furthermore, the fixing socket has a destructive structure corresponding to the to-be-destroyed portion, and the destructive structure is used to destroy the to-be-destroyed portion, so as to disconnect the connecting portions.

In an embodiment of the present invention, a plurality of LEDs is disposed on one end of each light pipe for emitting light waves into the light pipe, and the other end of the light pipe displays the light wave transmitted via the light pipe, so as to be used as an indicating lamp.

In an embodiment of the present invention, the fixing socket comprises a plurality of buckling portions, and the light pipes are fixed on the fixing socket with the buckling portions.

In an embodiment of the present invention, the fixing socket comprises a plurality of plugs, and the light pipes are fixed on the fixing socket with the plugs.

In an embodiment of the present invention, the destructive structure can block the transmission path of the light wave, so as to prevent the mutual interference of the light waves when passing through the connecting portions between two light pipes. The destructive structure is, for example, a sharp object, a notch structure, or a quirk, and it can cut off the to-be-destroyed portion between the connecting portions under an external force. The to-be-destroyed portion can be a necked-down portion, or can have at least one through hole.

The present invention further provides a light-guiding structure, which comprises a plurality of light pipes, a plurality of connecting portions, and a fixing socket. The light pipes are disposed on the fixing socket, and they are connected with the connecting portions. A to-be-destroyed portion is formed between the connecting portions. Furthermore, the fixing socket has a plurality of light shielding walls, and the light pipes are separated by the light shielding walls. The light shielding wall has a destructive structure corresponding to the to-be-destroyed portion, and the destructive structure is used to destroy the to-be-destroyed portion, so as to disconnect the connecting portions.

The light-guiding structure cutting off the to-be-destroyed portion is employed in the present invention, such that the light waves cannot be transmitted through the connecting portions, so as to prevent the mutual interference of the light waves.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
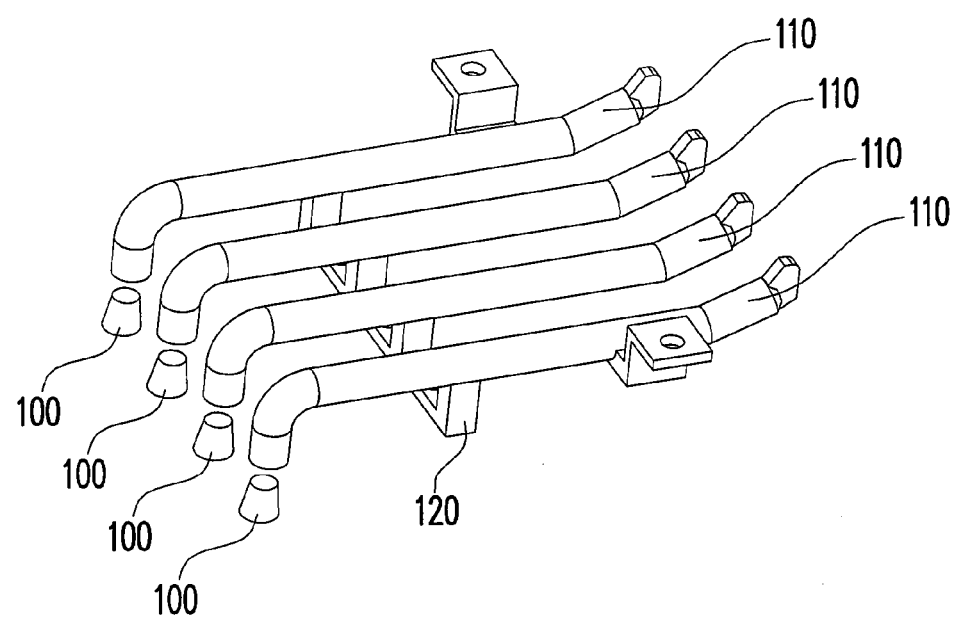
FIG. 1 is a schematic view of the configuration of conventional light pipes.
Figure 2:
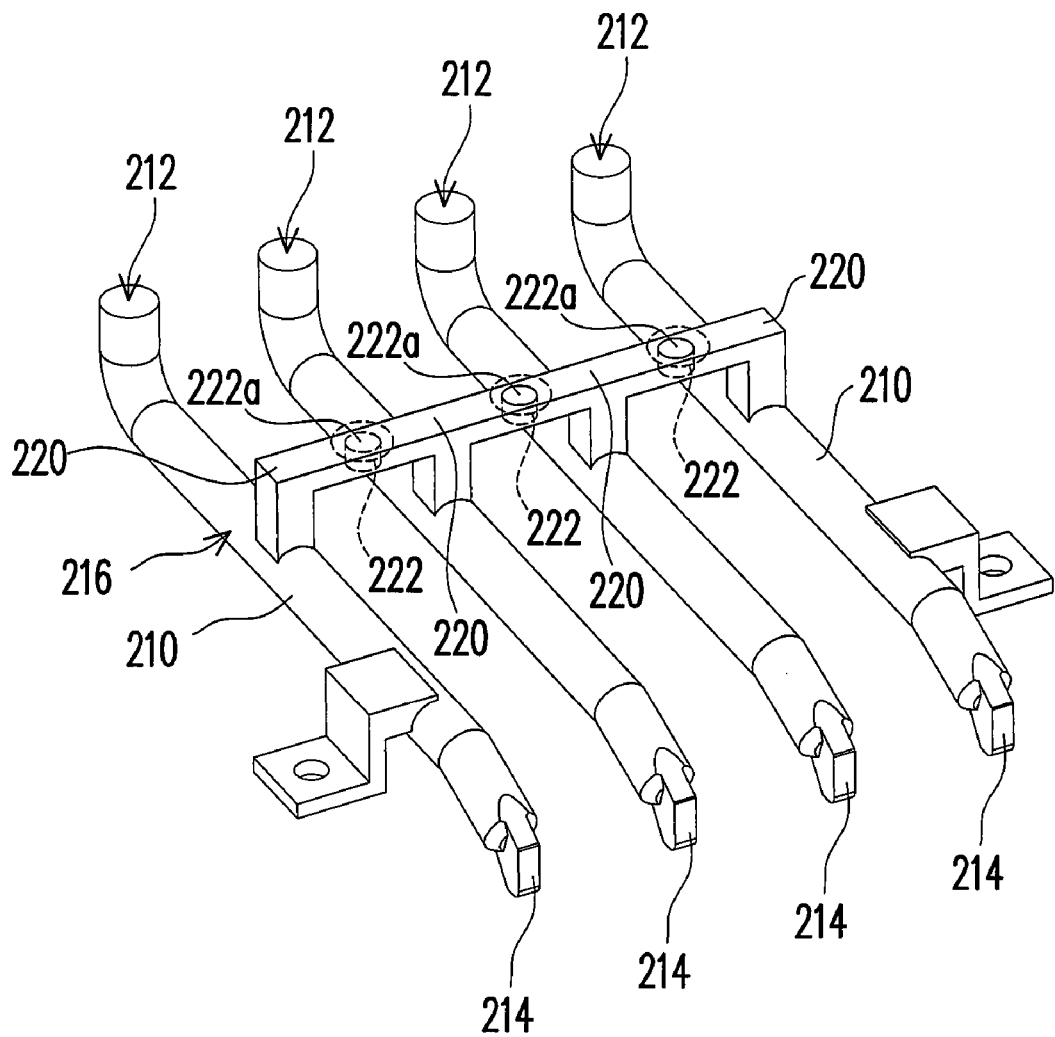
FIG. 2 is a schematic view of a light-guiding structure according to an embodiment of the present invention.
Figure 3:
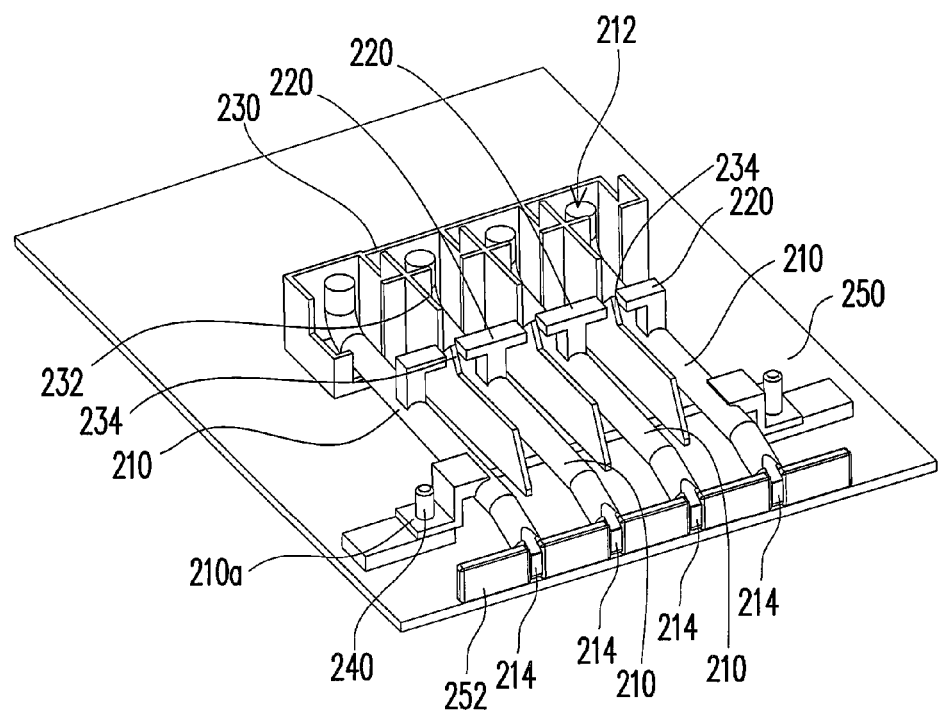
FIG. 3 is a schematic view of the configuration of a light-guiding structure according to an embodiment of the present invention.

FIG. 2 is a schematic view of light-guiding structure according to an embodiment of the present invention, and FIG. 3 is a schematic view of the configuration of a light-guiding structure according to an embodiment of the present invention. It should be firstly noted that, the light-guiding structure in this embodiment can be applied for the indicating lamp of a display, a portable computer, a tablet PC, a personal digital assistant (PDA) or the like to display the operation state of the electronic device. However, those of ordinary skill in the art may apply it on any indicating lamps, point light sources, or linear light sources, which is not limited herein.

Referring to FIGS. 2 and 3, the light-guiding structure 200 includes a plurality of light pipes 210, a plurality of connecting portions 220, and a fixing socket 230. Before the light pipe 210 is assembled on the fixing socket 230, the light pipes 210 are connected with the connecting portions 220, such that the light pipes 210 can be integrally assembled on a suitable position in the electronic device. The light pipe 210 and the connecting portions 220 are, for example, injected by a forming mold and then formed through molding releasing process. Each light pipe 210 has a light entrance end 212 and a light exit end 214, and the light entrance end 212 is corresponding to each indicating light source (not shown) of the electronic device, for example, a red LED, a green LED, or a blue LED.

The light emitted by the indicating light sources may enter from the light entrance end 212 of the light pipe 210, and transmit to the light exit end 214 through the light transmission part 216, for the user to see the indicating lamp to be bright or dark to determine the operation state of the electronic device. As shown in FIG. 3, a substrate 250 has a partition plate 252, and the light exit end 214 of each light pipe 210 is exposed on the partition plate 252, to be used as the indicating lamps.

In order to prevent light leakage, the fixing socket 230 has a plurality of light shielding walls 232, and each light pipe 210 is disposed on the fixing socket 230 and separated by the light shielding walls 232, so as to reduce the light refraction effect, and thereby obstructing the light waves. However, since the light waves may still pass through the light shielding walls 232 via the connecting portions 220, it is not sufficient for blocking the interference of the light wave by way of merely using the light shielding walls 232 of the fixing socket 230. In the forming process, the light pipes 210 are connected together through the connecting portions 220, which is convenient for the subsequent assembling operation. But after the assembling process, if the connecting portions 220 are still maintained on the light pipes 210, the possibility of the interference of the light waves is increased without any benefits. Therefore, in the present invention, the connecting portions 220 are destroyed to block the transmission path of the light waves.

Referring to FIG. 3, it is a schematic view of the configuration of a light-guiding structure according to an embodiment of the present invention. A to-be-destroyed portion 222 is formed between the connecting portions 220, and the fixing socket 230 correspondingly has a destructive structure 234, such that when an external force is applied to the to-be-destroyed portion 222, the to-be-destroyed portion 222 is cut off by the destructive structure 234. In order to easily destroy the connecting portions 220, the sectional area of the to-be-destroyed portion 222 can be smaller than that of the other regions without being destroyed, for example, a through hole 222a or a necked-down portion is formed on the to-be-destroyed portion 222 between the connecting portions 220.

In this embodiment, the destructive structure 234 can be disposed on the light shielding wall 232 in a form of protruding from the light shielding wall 232 to form a sharp object. In another embodiment, the destructive structure 234 can also be formed by opening a notch structure or a V-shaped quirk on the light shielding wall 232, such that the connecting portions 220 are destroyed. As shown in FIG. 3, after the light pipes 210 has been assembled, the to-be-destroyed portion 222 and the through hole 222a of FIG. 2 are destroyed, which cannot be seen in FIG. 3. The destructive structure 234 is not limited to be disposed on the light shielding wall 232, and it can be separately disposed on the fixing socket 230 depending upon the actual conditions.

Figure 4:
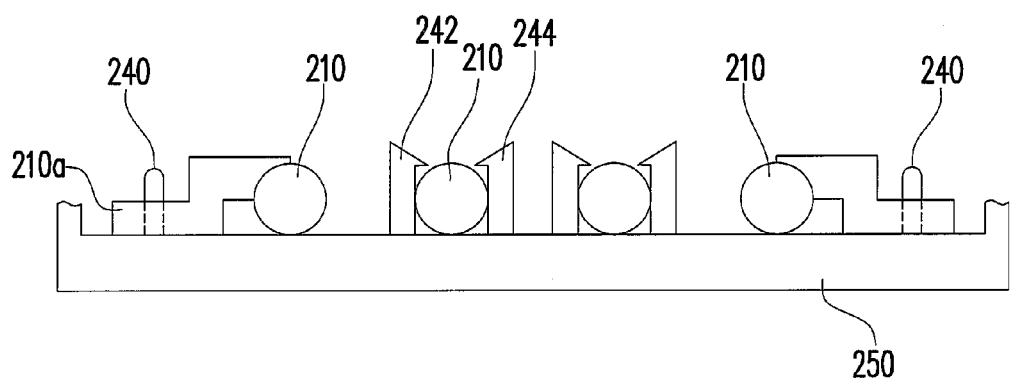
FIG. 4 is a schematic cross-sectional view of the light pipes of FIG. 3 fixed on a fixing socket.

FIG. 4 is a schematic cross-sectional view of the light pipes of FIG. 3 fixed on a fixing socket. In order to firmly fix each light pipe 210 on the fixing socket 230, the fixing socket 230 further has a plurality of plugs 240 and a plurality of buckling elements 242 and 244. The plugs 240 can be inserted into a base 210a of the light pipe 210, and the plugs 240 are heated and pressed, so as to be melted and fixed on the base 210a. Furthermore, the buckling elements 242 and 244 are arranged on two sides of the light pipes 210 in pairs. Once an external force is applied on the light pipes 210, the buckling elements 242 and 244 are deformed under the external force, such that the light pipe 210 passes between the buckling elements 242 and 244 and thereby being fixed under the buckling elements 242 and 244. Each light pipe 210 can be fixed on the fixing socket 230 through the plugs 240 and the buckling elements 242 and 244, so even if the connecting portions 220 are destroyed, the assembling reliability is not affected.

To sum up, the light-guiding structure of the present invention includes a plurality of light pipes, a plurality of connecting portions, and a fixing socket. A to-be-destroyed portion is formed between the connecting portions, and the fixing socket has a corresponding destructive structure. When a force is applied on the to-be-destroyed portion, the to-be-destroyed portion is cut off by the destructive structure, so that the light waves cannot be transmitted through the connecting portions. Furthermore, the fixing socket further has a plurality of light shielding walls disposed between two neighboring light pipes, so as to prevent the interference of the light waves, and thereby preventing the neighboring light sources from affecting each other.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light-guiding structure, comprising:
   a plurality of light pipes;
   a plurality of connecting portions, for connecting the light pipes, wherein a to-be-destroyed portion is formed between the connecting portions; and
   a fixing socket, for bearing the light pipes, having a destructive structure corresponding to the to-be-destroyed portion, wherein the destructive structure is used to destroy the to-be-destroyed portion, so as to disconnect the connecting portions.

2. The light-guiding structure as claimed in claim 1, wherein the connecting portions and the light pipes are integrated as a whole, and the to-be-destroyed portion is a necked-down portion.

3. The light-guiding structure as claimed in claim 1, wherein the to-be-destroyed portion has at least one through hole.

4. The light-guiding structure as claimed in claim 1, wherein the fixing socket comprises a plurality of light shielding walls, and the light pipes are separated by the light shielding walls.

5. The light-guiding structure as claimed in claim 1, wherein the fixing socket comprises a plurality of buckling portions, and the light pipes are fixed on the fixing socket with the buckling portions.

6. The light-guiding structure as claimed in claim 1, wherein the fixing socket comprises a plurality of plugs, and the light pipes are fixed on the fixing socket with the plugs.

7. The light-guiding structure as claimed in claim 1, further comprising a plurality of light sources disposed on one end of the light pipes for emitting light waves into the light pipes.

8. The light-guiding structure as claimed in claim 7, wherein the light sources are light emitting diodes.

9. The light-guiding structure as claimed in claim 1, wherein the destructive structure comprises a sharp object or a notch structure.

10. A light-guiding structure, comprising:
- a plurality of light pipes;
- a plurality of connecting portions for connecting the light pipes, wherein a to-be-destroyed portion is formed between the connecting portions; and
- a fixing socket for bearing the light pipes, having a plurality of light shielding walls, wherein the light pipes are separated by the light shielding walls, the light shielding walls have at least one destructive structure corresponding to the to-be-destroyed portion, and the destructive structure is used to destroy the to-be-destroyed portion, so as to disconnect the connecting portions.

11. The light-guiding structure as claimed in claim 10, wherein the destructive structure comprises a sharp object or a notch structure.

12. The light-guiding structure as claimed in claim 10, wherein the to-be-destroyed portion is a necked-down portion.

13. The light-guiding structure as claimed in claim 10, wherein the to-be-destroyed portion has at least one through hole.

* * * * *